United States Patent [19]

Dahandeh et al.

[11] Patent Number: 5,087,992
[45] Date of Patent: Feb. 11, 1992

[54] METHOD FOR ASSIGNING TRACKS ON A MAGNETIC DATA STORAGE DISK TO DIFFERENT READ/WRITE FREQUENCY ZONES

[75] Inventors: Shafaollah Dahandeh, Norman; Stephen R. Genheimer; Steven L. Welty, both of Mustang, all of Okla.

[73] Assignee: Seagate Technology, Inc., Scotts Valley, Calif.

[21] Appl. No.: 359,740

[22] Filed: May 31, 1989

[51] Int. Cl.$^5$ ............... G11B 27/36; G11B 5/09; H03M 13/00
[52] U.S. Cl. ............................................. 360/31
[58] Field of Search .............. 360/51, 65, 40, 31; 369/54, 58; 371/40.1

[56] References Cited

U.S. PATENT DOCUMENTS 4,799,112  1/1989  Bremmer et al. .................. 360/31

*Primary Examiner*—Aristotelis Psitos
*Assistant Examiner*—Won Tae C. Kim
*Attorney, Agent, or Firm*—Bill D. McCarthy; Edward P. Heller, III; Louis W. Watson

[57] ABSTRACT

A method for assigning tracks on a magnetic data storage disk to different zones in which data is written at selected zone frequencies so as to write data on the tracks at the maximum frequency that will limit the read/write error rate to a preselected value. A plurality of data bit groups is written onto selected tracks and read while checking for error to determine an error indication parameter for each of the zone frequencies. Tracks are assigned to frequency zones by determining such parameter for all tracks and assigning each track to the zone corresponding to the maximum frequency for which the error indication parameter is below the preselected value or by determining circular paths at which the error indication parameter has the preselected value for each of the selected frequencies and assigning all tracks between two consecutive circular paths to the lower of the two frequencies defining the circular paths.

6 Claims, 4 Drawing Sheets

METHOD FOR ASSIGNING TRACKS ON A MAGNETIC DATA STORAGE DISK TO DIFFERENT READ/WRITE FREQUENCY ZONES

FIELD OF THE INVENTION

The present invention relates generally to methods for optimizing the storage of data on magnetic data storage disks and, more particularly, but not by way of limitation, to methods for assigning tracks on the disks to different read/write frequency zones to optimize the rate at which data is written on each track.

BRIEF DESCRIPTION OF THE PRIOR ART

A data storage system often used in computer applications is comprised of a rotatable magnetic disk, a read/write head positioned adjacent the disk to magnetize portions of concentric tracks on the disk, and associated electronics that controls the generation of magnetization reversals on the tracks in accordance with a coding scheme that relates the reversals to bits of digital data to be stored. Subsequently, the read/write head detects the magnetization reversals so that the stored data can be recovered.

As discussed in U.S. Pat. No. 4,799,112, issued Jan. 17, 1989 to Bremmer et al., the teachings of which are hereby incorporated by reference, the amount of data stored by such a system can be optimized by grouping the tracks into zones and writing all tracks in each zone at a frequency, differing from zone-to-zone, assigned to that zone. Such patent discloses a circuit for implementing this approach to data storage optimization and further discloses a method for selecting the zone frequencies and track-to-zone assignments in a way that will result in a substantially constant error rate in the writing and subsequent reading of data on and from all tracks on the disk.

In the implementation taught by Bremmer et al, the error rate for each track at each of the selected frequencies is determined by measuring a magnetic characteristic of the disk; in particular, the shape of an electrical pulse produced by the read/write head as the head passes a single magnetic reversal, and using a mathematical model to determine the resolution of a series of such pulses so that the error rate is limited by assigning tracks to frequency zones for which the resolution will achieve a selected minimum.

While the Bremmer et al. patent has thus taught an effective way of optimizing data storage on magnetic disks, its applicability depends upon a mathematical model and is, accordingly, limited to circumstances in which the model applies. Unfortunately, it has been found that the error rate performance at various transfer rates will not follow the model for all data storage systems. Thus, while the general approach taught by Bremmer et al. provides a useful method for optimization of data storage on magnetic disks, the specific teachings of these inventors do not have unlimited applicability.

SUMMARY OF THE INVENTION

The present invention provides a method for assigning tracks to zones in the optimization approach taught by Bremmer et al. that will enable such approach to be applied to substantially any magnetic disk data storage system. To this end, the method of the present invention contemplates that tracks of a magnetic disk will be assigned to the zones taught by Bremmer et al. without the use of mathematical modeling; rather, an error indication parameter is measured directly by writing a plurality of known data bit groups on selected tracks of a disk at selected zone frequencies and subsequently reading the stored data for comparison with the data that was written. By means of such comparison, the method generates an error indication parameter for each of the selected tracks at each of the selected write frequencies that provides a direct measure of the error rate for the selected tracks at the selected frequencies. Track assignments are then made by assigning each track, on the basis of the measured error indication parameters, to the highest frequency zone for which the value of the error indication parameter will not exceed a preselected value.

An object of the invention is to provide a method for optimizing the amount of data that can be stored on a magnetic disk of a data storage system.

Another object of the invention is to provide a data storage optimization method that can be utilized to optimize data storage on substantially any magnetic disk data storage system.

Other objects, features and advantages of the present invention will become apparent from the following detailed description when read in conjunction with the drawings and appended claims.

GENERAL METHOD

Figure 1:
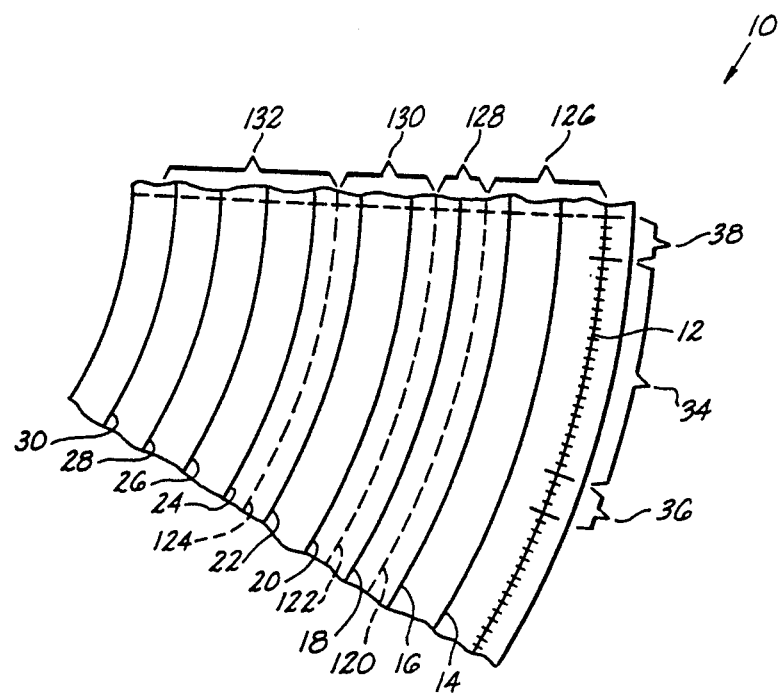
FIG. 1 is a fragmentary view of a magnetic data storage disk illustrating the manner in which data is stored on the disk and the assignment of frequency zones.

To provide a basis for a discussion of the steps of the method of the present invention, it will be useful to begin with a brief discussion of the manner in which a magnetic data storage disk is formatted to receive groups of data bits. FIG. 1, which illustrates a portion of a magnetic disk 10, has been presented for this purpose.

Figure 2:
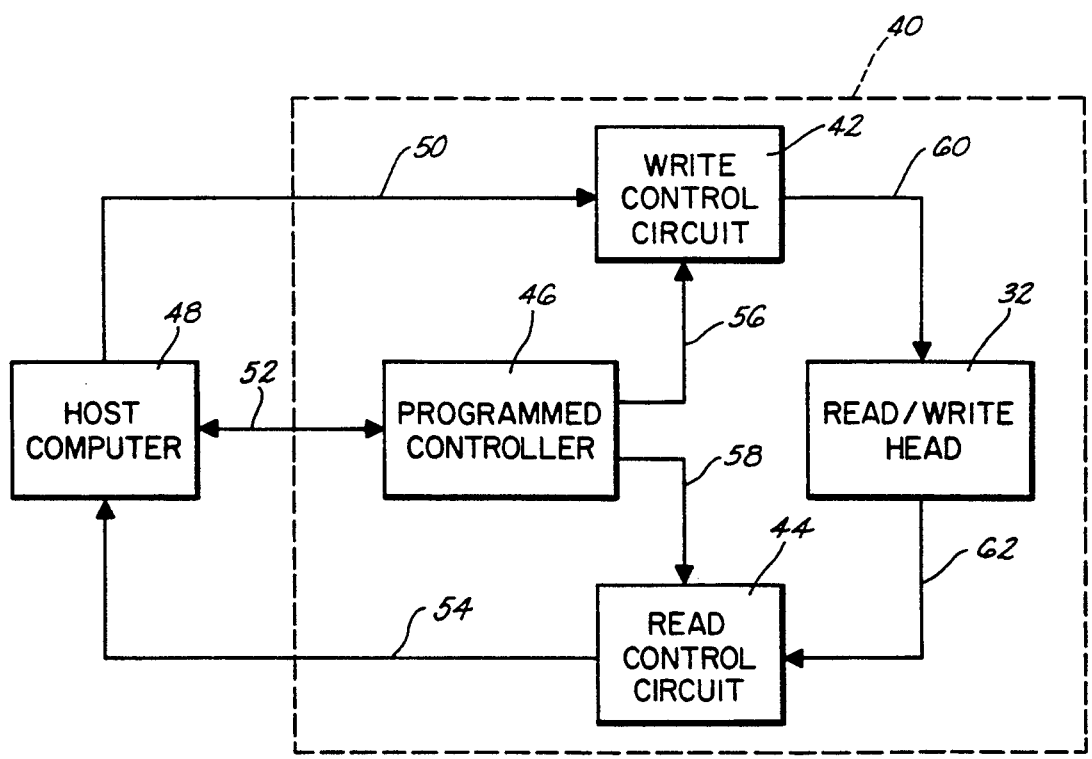
FIG. 2 is a block diagram of one computer system used to implement the method of the present invention.
Figure 3:
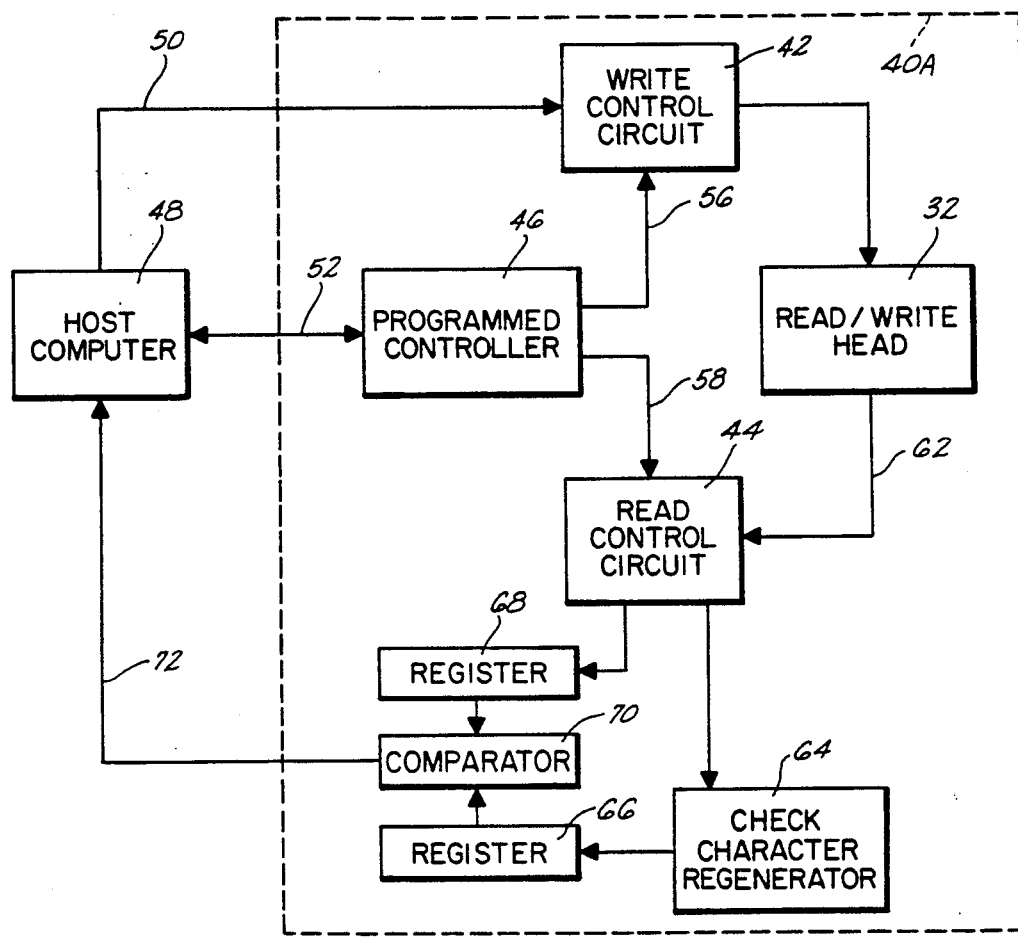
FIG. 3 is a block diagram of a second computer system used to implement the method.

As shown in FIG. 1, the disk 10 is divided into a plurality of concentric, circular tracks, selected ones of which have been indicated and designated by the numerals 12-30, along which data can be stored in the form of magnetization reversals produced by rotating the disk 10 adjacent a read/write head, schematically indicated at 32 in FIGS. 2 and 3, while controlling the current through the head 32. Subsequently, the data, that is, the reversals, can be read by monitoring voltages induced in the read/write head 32 by movement of the reversals by the head 32. In general, to maximize the amount of data that can be stored, the disk will contain many more data tracks than have been illustrated in FIG. 1; only a few data tracks have been shown in such Figure in order to bring out the salient features of the present invention.

As has been illustrated for the track 12, each track is divided into a plurality of sectors that are each comprised of a data block 34, that is utilized to store data in the form of a series of magnetic reversals, indicated by cross hatching the track 12, and a control block 36 that is utilized to store a string of control bits in a similar manner. Additionally, the track can include an initialization block 38 that indicates the first sector on the track.

The lengths of the data blocks 34 are selected in relation to the rotation rate of the disk and the frequency at which data is written therein to receive groups of data bits organized into a preselected number of bytes that is selected by the user of the disk. Such number of bytes is generally a power of two with 512 bytes and 1024 bytes being commonly used examples. However, no limitation other than the circumference of the track need be imposed on the number of bits in a data bit group and no such limitation is to be inferred in the discussion of the method of the present invention to follow.

The control block generally contains a series of bits that perform various control functions with an example, utilized in one manner of carrying out the present invention, being the checking of the written data bits for errors. In particular, and as is known in the art, a check character can be generated during writing of a data bit group onto a data block and stored in the control block following the data block and regenerated during reading of the data bit group for comparison with the stored check character. Differences between the stored and regenerated check characters thus provides a means for checking for errors in the transcription and reading of data. As is known in the art, the error check can be made each time a group of data bits is written so that the group can be rewritten to correct transcription errors.

The method of the present invention contemplates that a large number of data bit groups will be written at selected frequencies on selected tracks of the disk 10, with each group being error checked to provide the value of an error indication parameter, indicative of the rate at which errors are made in the writing and/or reading of data on the selected tracks, in a manner that will be discussed below with reference to FIGS. 2 through 4. For purposes of the present invention, the total amount of data contained in these data bit groups is selected on the basis of statistics; that is, such amount is made sufficient to provide an adequate statistical sample for the determination of the error rate for each track at each frequency at which the track is written. Thus, for example, for detection of an error rate of $10^{-11}$, $2.3 \times 10^{11}$ bits would be a sufficient sample to provide a confidence level of 90% in the value of an error indication parameter determined by the methods to be discussed below. Moreover, as will become clear below, the method of the present invention contemplates that the values of the error indication parameter will be preselected as a means of making the assignment of tracks to zones thereon. Such preselection is utilized to limit the time required to carry out the method by discarding data that indicates a significant variation from the preselected error rate. Thus, for example, if the preselected error rate is of the order of $10^{-11}$, error checking may be discontinued for any frequency and any track that yields more than one error in only $10^6$ bits or for any frequency and any track that does not yield at least one error in $10^{12}$ bits.

With this general background, the method of the present invention can be generally described as comprising four basic steps that are carried out on selected tracks at each of a selection of write frequencies: writing the data bit groups; reading the groups; comparing the written and read data to determine the value of an error indication parameter for each track at each frequency; and utilizing the error indication parameters to assign the tracks to frequency zones corresponding to the frequencies at which the tracks are written. Specifics of the method will now be discussed with reference to FIGS. 2 through 6.

ERROR INDICATION PARAMETER DETERMINATION

It is contemplated that any parameter that is indicative of a read/write error rate can be utilized to practice the present invention and three examples will be discussed with reference to FIGS. 2 through 4. Referring first to FIG. 2, such Figure illustrates in block diagram form an apparatus that can be used to measure an error indication parameter that is selected to be the ratio of the number of data bit groups for which at least one bit of the read data disagrees with the corresponding bit of the written data to the total number of data bit groups written.

FIG. 2 contemplates that the disk 10 (not shown in FIG. 2) will be a portion of magnetic disk data storage system 40 that includes the read/write head 32, a write control circuit 42, a read control circuit 44, and a programmed controller 46. While the system 40 can be any magnetic disk data storage system that can be interfaced with a host computer 48 to store data at a selectable write frequency, a suitable example of the system 40 is the circuit shown in FIG. 6 of the aforementioned U.S. Pat. No. 4,799,112 to Bremmer et al. (The detailed structure of the Bremmer et al. circuit has not been illustrated in FIG. 2; rather, for clarity of discussion of the present invention, FIG. 2 presents such circuit in block form.) In such system, the controller 46 is a microprocessor that can be programmed to control the write control circuit 42 to write data received on a data path 50 at a selected frequency and on a selected track as dictated by the host computer 48 via an interface indicated by the path 52 in FIG. 2. The controller is further programmed to read the data on any track, again at the dictate of the host computer 48, and to return the read data to the host computer 48 on a data path 54. To these ends, control paths 56 and 58 transmit control signals from the controller 46 to the write control circuit 42 and the read control circuit 44 so that electrical signals corresponding to data bits to be written will be transmitted at the selected frequency to the read/write head 32 on signal path 60 and signal corresponding to read bits will be transmitted from the read/write head on signal path 62.

In carrying out the method of the present invention using the system shown in FIG. 2, the error checking capabilities of the host computer 48 are used to derive an error indication parameter that is defined, as noted above for this case, as the ratio of the number of data bit groups that contain at least one error to the number of such groups read. To this end, the host computer is programmed to repeatedly generate random data bit groups that are transmitted to the head disk assembly 40 along with commands that will cause such groups to be written on a selected track at a selected frequency while simultaneously storing each group in the internal memory of the computer 48. The computer 48 is further programmed to transmit commands to the head disk assembly 40 that will cause each data group to be read immediately following writing of such group so that a bit-by-bit comparison can be of the written and read groups can be performed in the computer 48 to count the number of data bit groups for which an error has been made in either the writing or reading operation. Such count, and a count of the number of data bit groups transmitted to the assembly 40 are then stored in the host computer for subsequent determination and retrieval of the error indication parameter defined above.

FIG. 3 illustrates a modified computer system that enables two additional error indication parameters to be measured. In particular, the host computer 48 in FIG. 3 is programmed to generate a check character that is transmitted to the head disk assembly, designated 40A in FIG. 3, for storage with each data bit group and the head disk assembly 40A includes in addition to the controller 46, the read/write head 32, and the control circuits 42 and 44, a conventional check character regenerator 64 that regenerates the check character from the read data each time a data bit group is read. To obtain a second of the measure of error rate, the regenerated check character is transmitted to a register 66 while the stored check character is transmitted to a register 68. At the conclusion of the reading of a data bit group, the contents of the registers 66 and 68 are compared by a comparator 70 which provides a signal to the host computer 48 on signal path 72 each time the contents of the registers 66 and 68 disagree. The second error indication parameter is the ratio of the number of such disagreements to the number of data bit groups written and is determined by programming the host computer to repeatedly cause the writing and immediate reading of data bit groups while counting both the number of data bit groups and signals from the comparator 70.

The computer system shown in FIG. 3 further permits a third error indication parameter to be determined. As discussed in the aforementioned U.S. Pat. No. 4,799,112 to Bremmer et al., the controller 46 is programmed to cause successive data bits read by the read control circuit 44 to be assigned to successive temporal windows having durations equal to the period, T, associated with each frequency at which the data is written as illustrated in FIG. 4 wherein is plotted a series of electrical pulses received by the read control circuit 44 from the read/write head against time for a plurality of windows 74–82. Ideally, during operation of a head disk assembly, such as the assembly 40 or 40A, these pulses would be centered in the windows as indicated for a pulse 84 for synchronization of the read data stream necessary for recovery of a stored data bit group. In practice, the pulses will not be precisely centered, as shown for pulses 86 and 88, and it is the lack of centering that gives rise to read/write errors. That is, should a pulse be far enough off center to be positioned in an inappropriate temporal window, the data bit group will be incorrectly read.

Figure 4:
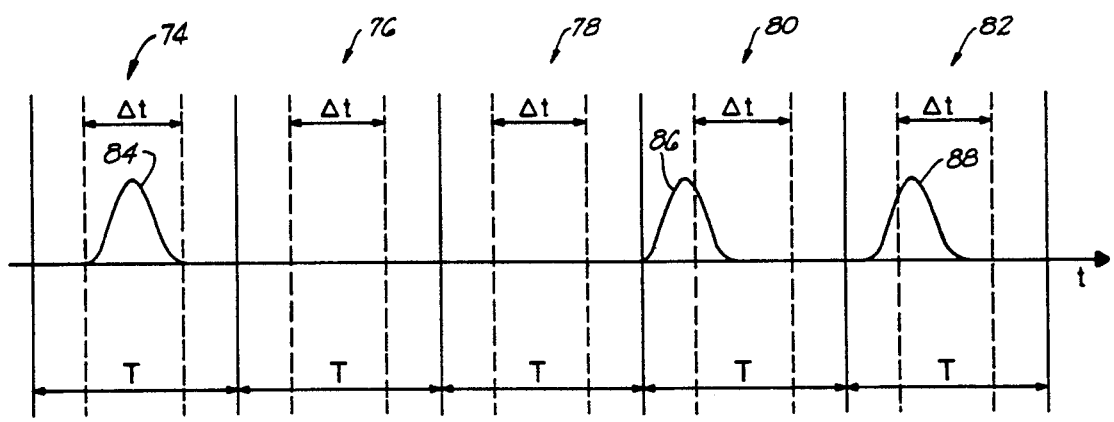
FIG. 4 is a graph of the signal produced by the read/write head in FIGS. 2 and 3.

In the third error indication parameter determination, the host computer 48 is programmed, in a conventional manner, to provide commands to the controller 46 that will cause the edges of the temporal windows to be time shifted to the positions indicated in dashed lines in FIG. 4 so that any pulse time centered outside a time increment, $\Delta t$, centered on each temporal window and having a duration less than the period T, will be treated by the check character regenerator 64 as being located in an adjacent temporal window. Thus, the pulse 86 of FIG. 4 would be treated as being in the temporal window 78. The third error indication parameter is the ratio of the duration of the time increment $\Delta t$ to the period T that will result in a preselected error rate defined by the host computer as the ratio of error signals from the comparator 70 to the total number of data bit groups written and read.

TRACK ASSIGNMENT

Figure 5:
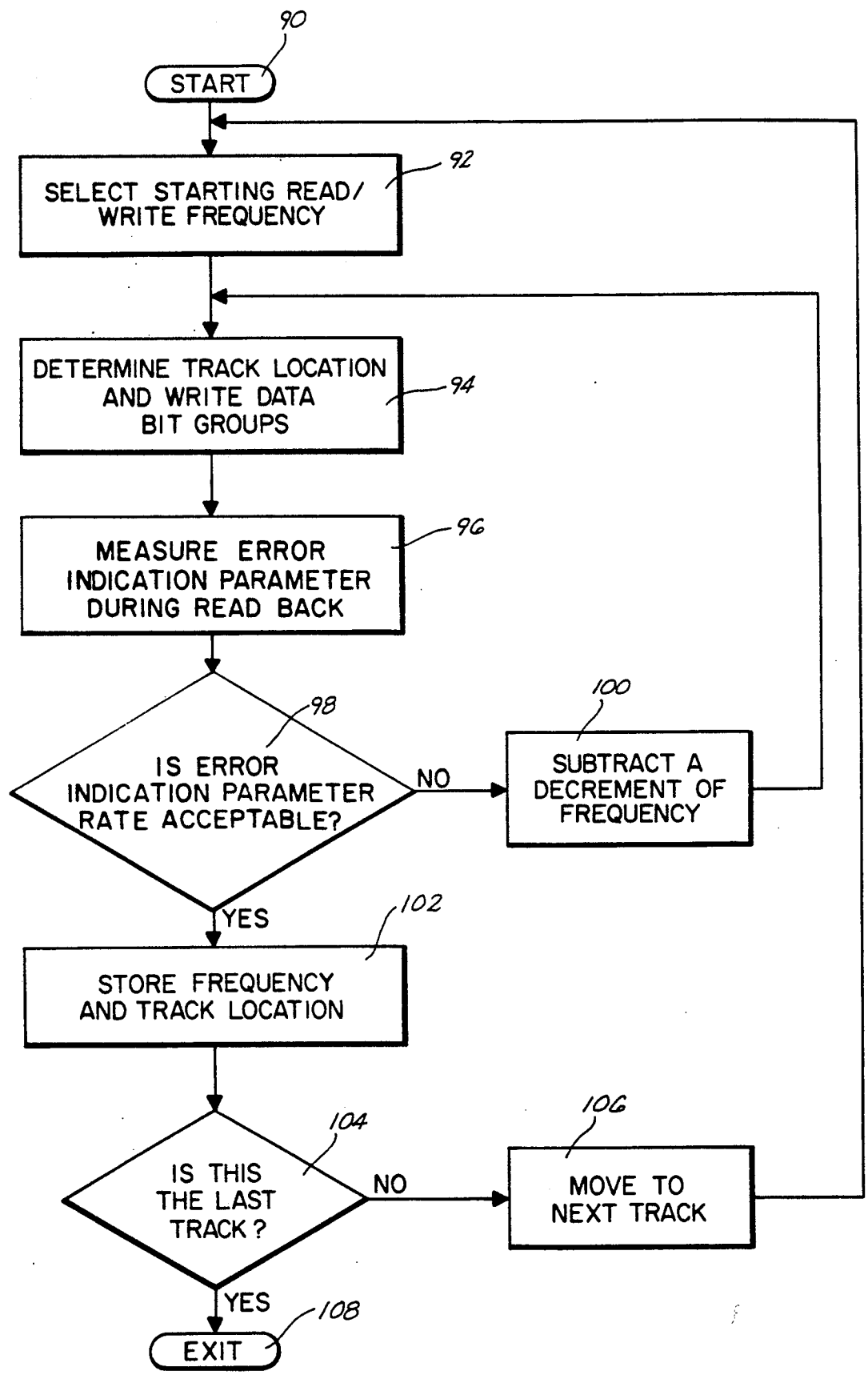
FIG. 5 is a flow chart illustrating one method of utilizing measured error indication parameters to effect zone assignments.
Figure 6:
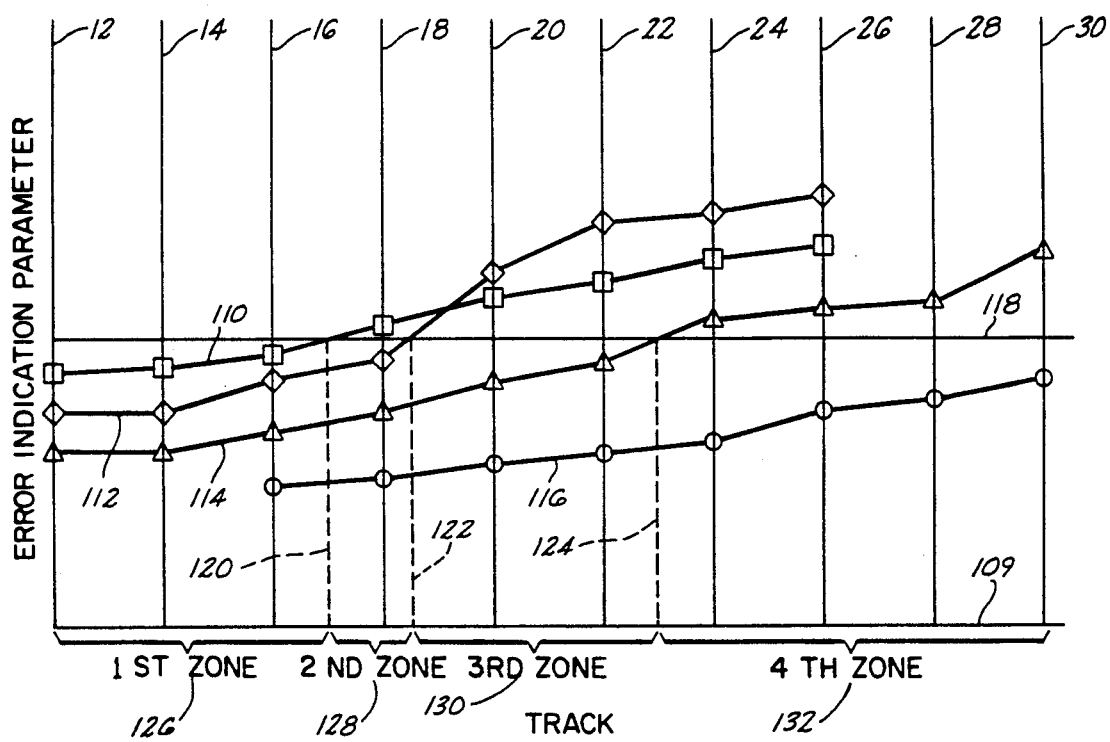
FIG. 6 is a graph illustrating a second method of utilizing measured error indication parameters to effect zone assignments.

FIGS. 5 and 6 illustrate two techniques for making the track-to-zone assignments from values of the error indication parameters measured by any of the techniques discussed above. In both cases, it is contemplated that a value of the error indication parameter that is not to be exceeded has been selected and the track assignments are then made to meet this criterion.

Referring first to FIG. 5, such figure is a flow chart for programming the host computer 48 that contemplates that the tracks selected for the track-to-zone assignment will include all tracks on the disk 10; that is, the selection is not limited to the tracks 12–30 shown in FIG. 1. In this first assignment technique, the host computer 48 is programmed to start with a track at one edge of the disk 10, assign such track to a frequency zone, and then proceed to the next track until all tracks have been assigned to frequency zones. To this end, once the program begins running, as indicated by the start box 90, the computer 48 will select a starting read/write frequency as indicated at 92. Preferably, such frequency will be the highest of the zone frequencies to which the tracks are to be assigned and FIG. 5 has been drawn for such case. However, as will be recognized by those skilled in the art, the starting frequency may also be the lowest of the zone frequencies.

Once a frequency has been selected, the first track is located as shown at 94 and the value of a selected error indication parameter is determined by any of the techniques that have been discussed above as indicated at 96 in FIG. 5. Such value is then compared to the preselected value at 98 and should the measured value be unacceptable, the program proceeds to the next lower frequency, at 100, and returns the track location step 94. Such cycling continues until a frequency is found that will result in an acceptable value for the error indication parameter at which point both the track location and the frequency are stored in the computer 48, as indicated at 102, for future storage in the controllers 46 of production head disk assemblies 40. It will thus be seen that the effect of the loop formed by the steps 94 through 100 is to locate a pair of frequencies for one of which the error indication parameter is above the preselected value and for one of which the error indication parameter is below the preselected value. The zone to which the track is then assigned is then the zone adopted for the lower of this pair of frequencies.

Following storage of each track assignment, the computer 48 programmed to determine whether all tracks have been assigned to a frequency zone, as at 104, and, if not, to move to the next track, as at 106, and return to the start of the error indication parameter measurements. The running of the program is terminated, as indicated at 208, once all tracks have been assigned to a zone on the disk 10.

In the second technique for assigning the tracks to the zone frequencies on the basis of error indication parameter measurements, illustrated in FIG. 6, only a sampling of tracks are used. For purposes of more clearly illustrating the method, FIG. 6 has been made consistent with FIG. 1 in that each of the tracks 12-30 of FIG. 1 has been represented as a vertical line extending from a track axis 109 and labelled with the track indication numeral shown in FIG. 1. Moreover, for clarity of illustration, both of these figures have been drawn for the case in which the disk 10 is to divided into four frequency zones. As will be clear from the teachings of the aforementioned U.S. Pat. No. 4,799,112, a disk will generally be divided into many more zones in order to optimize the capacity of the disk to store data.

In this second technique, the error indication parameter is measured for each of the selected tracks at each of the frequencies to which the zones are to be assigned, excepting only those frequencies that are excluded as resulting in too large or too small an error rate as discussed above, and such measurements can be presented graphically as a series of curves 110–116 on the error indication parameter versus track plot graph of FIG. 6. (It will be recognized by those skilled in the art that these curves need not be displayed for the assignment of tracks to zones; the computer 48 can be programmed to make the assignment as discussed below and provide only the results of the assignment.) In particular, the curves 110 through 116 correspond to the zone frequencies in order from the highest of these frequencies to the lowest thereof.

To assign the tracks to the zones, each of the selected tracks for which an error indication parameter measurement has been made is assigned to the highest frequency zone for which the measured error indication parameter does not exceed the preselected value that has been indicated by the line 118 in FIG. 6. Thus, tracks 12, 14 and 16 would be assigned to the highest of the frequencies for which FIG. 6 has been drawn; that is, to the frequency associated with the curve 110. Similarly, track 18 would be assigned to the frequency corresponding to the curve 112; tracks 20 and 22 would be assigned to the frequency corresponding to the curve 114; and tracks 26, 28 and 30 would be assigned to the frequency corresponding to the curve 116. Nonselected tracks are then assigned with respect to the selected track assignments. In particular, nonselected tracks between two selected tracks that have been assigned to the same frequency zone are similarly assigned to that zone. Thus, for example, all tracks between 24 and 30 will be assigned to the frequency zone to which the tracks 24 to 30 are assigned. Nonselected tracks that are between two selected tracks that have been assigned to different frequency zones are then assigned by interpolation as indicated in FIG. 6. In particular, the interpolation is carried out to determine circular paths 120-124, indicated in dashed lines in FIG. 1 and represented by dashed lines in the manner of the representation of selected tracks in FIG. 6, for which the error indication parameter would be substantially equal to the preselected value thereof. All tracks between a circular path and a selected path are then assigned to the same frequency zone as the frequency zone to which the selected path is assigned. The result is a zone map substantially as shown in FIGS. 1 and 6 wherein tracks from track 12 to circular path 120 are assigned to the frequency zone 126 corresponding to curve 110; tracks from the circular path 120 to the circular path 122 are assigned to a frequency zone 128 corresponding to the curve 112; tracks from the circular path 122 to 124 are assigned to a frequency zone 130 corresponding to the curve 114; and remaining tracks are assigned to a zone 132 corresponding to curve 116. Once the zones have been determined, the track assignments are stored in the programmed controllers 46, as taught by Bremmer et al., of production data storage systems.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. For a data storage system of the type comprising a rotatable magnetic disk and means for writing and subsequently reading groups of data bits on concentric tracks of the disk, wherein the tracks are grouped into zones and each zone is written at a selected zone frequency differing from the zone frequency at which each of the other zones is written, a method for assigning tracks to the zones comprising the steps of:
   selecting a plurality of tracks on the disk;
   writing a plurality of data bit groups for selected ones of the zone frequencies on each of the selected tracks;
   reading the data bit groups written on the selected tracks;
   comparing the read data bit groups to the written data bit groups to generate an error indication parameter indicative of the error rate in writing and subsequently reading data on the disk for each of the selected tracks and for each of the selected frequencies; and
   from the error indication parameters for each of the selected tracks, assigning each track on the disk to the highest frequency zone for which the value of the error indication parameter will not exceed a preselected value.

2. The method of claim 1 wherein the step of comparing the read data bit groups to the written data bit groups to generate an error indication parameter is further characterized as comparing each bit of the read data to the corresponding bit of the written data and selecting as the error indication parameter the ratio of the number of data bit groups for which at least one bit of the read data disagrees with the corresponding bit of the written data to the number of data bit groups written and read.

3. The method of claim 1 wherein an error check character is generated and written with each data bit group; wherein the error check character is both regenerated and read during reading of each data bit group; and wherein the step of comparing the read data to the written data to generate an error indication parameter comprises the steps of:
   comparing the error check characters read and regenerated during reading of each data block; and
   selecting as the error indication parameter the ratio of the number of data bit groups for which such read and regenerated error check characters disagree to the number of data bit group written and read.

4. The method of claim 1 wherein the step of reading the data bit groups includes assigning read bits to a succession of temporal windows each having a duration equal to the period corresponding to the frequency at which the data bit groups are written; and wherein the step of comparing the read data bit groups to the written data bit groups to generate an error indication parameter comprises the steps of:

time shifting the edges of the temporal windows to determine a time increment, shorter than said period and centered on each temporal window, that will induce a preselected rate of mismatch between the written data bit groups and the read data bit groups; and selecting as the error indication parameter the ratio of said time increment to said period.

5. The method of claim 1 wherein the selected tracks are all of the tracks on the disk; wherein, for each track, the steps of reading, writing and comparing are carried out at the zone frequencies in order of relative magnitudes of the zone frequencies until a pair of successive frequencies yield, respectively, a value of the error indication parameter above said preselected value and a value of the error indication parameter below said preselected value; and wherein the step of assigning the tracks to zones is characterized as assigning each track to the zone frequency of such pair for which the error indication parameter is below said preselected value.

6. The method of claim 1 wherein the step of assigning each track to the highest frequency zone for which the value of the error indication parameter will not substantially exceed a preselected value comprises the steps of:

assigning each of the selected tracks to the highest zone frequency for which the value of the error indication parameter does not exceed said preselected value;

assigning all tracks between each pair of selected tracks assigned to the same zone frequency to such zone frequency;

interpolating between each pair of tracks assigned to different zone frequencies to determine a circular path, concentric with the tracks, for which the error indication parameter is substantially equal to the preselected value thereof; and assigning all tracks between a circular path and a selected track to the zone frequency to which the selected track is assigned.

* * * * *